(12) United States Patent
Chaudhary et al.

(10) Patent No.: US 9,148,345 B2
(45) Date of Patent: Sep. 29, 2015

(54) LINK MANAGEMENT SYSTEMS AND METHODS FOR MULTI-STAGE, HIGH-SPEED SYSTEMS

(75) Inventors: Abhishek Chaudhary, Alpharetta, GA (US); Gustav Karl Larsson, Sunnyvale, CA (US); Jonathan T. Sewter, Kanata (CA); Feng Ling, Alpharetta, GA (US); Michael J. Wingrove, Kanata (CA)

(73) Assignee: Ciena Corporation, Hanover, MD (US)

( * ) Notice: Subject to any disclaimer, the term of this patent is extended or adjusted under 35 U.S.C. 154(b) by 88 days.

(21) Appl. No.: 13/351,020

(22) Filed: Jan. 16, 2012

(65) Prior Publication Data

US 2013/0182585 A1 Jul. 18, 2013

(51) Int. Cl.
*G01R 31/08* (2006.01)
*H04L 12/24* (2006.01)
*H04L 12/26* (2006.01)

(52) U.S. Cl.
CPC ......... *H04L 41/0896* (2013.01); *H04L 43/0811* (2013.01); *H04L 43/0829* (2013.01)

(58) Field of Classification Search
CPC ..................................................... H04L 47/10
USPC .......................................... 370/252; 709/220
See application file for complete search history.

(56) References Cited

U.S. PATENT DOCUMENTS

| | | | |
|---|---|---|---|
| 6,389,420 B1 * | 5/2002 | Vahalia et al. ........................ 1/1 |
| 6,834,049 B1 | 12/2004 | Tomar et al. |
| 7,512,674 B1 | 3/2009 | Jain et al. |
| 7,836,156 B1 * | 11/2010 | Ou et al. ........................ 709/220 |
| 8,028,186 B2 | 9/2011 | Bennett |
| 2002/0089996 A1 | 7/2002 | Komatsu et al. |
| 2003/0101426 A1 * | 5/2003 | Sarkinen et al. ................ 716/12 |
| 2004/0085893 A1 * | 5/2004 | Wang et al. .................... 370/216 |
| 2004/0120407 A1 * | 6/2004 | Searles et al. ................. 375/259 |
| 2004/0184249 A1 | 9/2004 | Aguinaga, Jr. et al. |
| 2005/0108376 A1 * | 5/2005 | Deval et al. .................... 709/223 |
| 2005/0240386 A1 * | 10/2005 | Carballo et al. ................ 703/14 |
| 2007/0204088 A1 | 8/2007 | Chen |
| 2007/0286295 A1 | 12/2007 | Wingrove et al. |
| 2008/0069006 A1 * | 3/2008 | Walter et al. ................... 370/252 |
| 2008/0215910 A1 * | 9/2008 | Gabriel et al. ..................... 714/4 |
| 2008/0232503 A1 * | 9/2008 | Kim .............................. 375/267 |
| 2008/0285449 A1 | 11/2008 | Larsson et al. |
| 2009/0252160 A1 | 10/2009 | Tran et al. |
| 2010/0159829 A1 | 6/2010 | McCormack |

* cited by examiner

*Primary Examiner* — Omar Ghowrwal
*Assistant Examiner* — Angel Brockman
(74) *Attorney, Agent, or Firm* — Clements Bernard PLLC; Christopher L. Bernard; Lawrence A. Baratta, Jr.

(57) ABSTRACT

A system includes a plurality of modules, a backplane communicatively coupled to the plurality of modules, a plurality of links defined between the plurality of modules over the backplane, and a link management system configured to dynamically manage parameters associated with each of the plurality of links. A link management method includes, for a system, defining a codebook for each module, device, and interconnect in the system, the codebook includes data describing physical link topologies and configuration parameters associated therewith, for initializing a link in the system, obtaining appropriate codebooks for each segment in the link, calculating an overall link loss for the link based on data in the appropriate codebooks, and obtaining configuration parameters for the link based on the overall link loss.

18 Claims, 12 Drawing Sheets

LINK MANAGEMENT SYSTEMS AND METHODS FOR MULTI-STAGE, HIGH-SPEED SYSTEMS

FIELD OF THE INVENTION

Generally, the field of art of the present disclosure pertains to high-speed networking devices, and more particularly, to link management systems and methods for multi-stage, high-speed systems such as switches, routers, and the like.

BACKGROUND OF THE INVENTION

Conventionally, communication networks have ever increasing demands for higher data rates, faster switching times, and reduced operational expenses. For example, communication networks may be realized through interconnected network elements. The network elements include ingress/egress ports for various services along with switching and/or processing elements. The capacity of the network elements has scaled from 10 Gb/s to significantly more than 1 Tb/s in a single bay/frame of equipment. The same is true for supercomputers, data centers, cloud computing, and the like. In physically realizing a network element, supercomputer, etc. there are a plurality of modules with various interconnections therebetween via high-speed links. Conventionally, the links include an optimized set of configuration data that is applied to all the links statically during initialization. Each link may include one or more physical electrical link segments that may or may not be present all the time. The physical and electrical characteristics of these links vary widely at very high data speeds. However, a limited and static set of configuration parameters are used for all the links in the system. Conventional link initialization is a tedious process which is error prone, requires frequent changes (e.g., whenever there is a hardware change), includes no systematic turn up or shut down procedure, and the like. Further, conventional modes of operation also waste power as unused links are initialized in a same manner as used links therefore are always powered up regardless of use.

BRIEF SUMMARY OF THE INVENTION

In an exemplary embodiment, a system includes a plurality of modules, a backplane communicatively coupled to the plurality of modules, a plurality of links defined between the plurality of modules over the backplane, and a link management system configured to dynamically manage parameters associated with each of the plurality of links. The link management system may be configured to selectively disable any inactive links of the plurality of links. The system may further include a plurality of codebooks each of which is associated with one of the plurality of modules and the backplane, wherein the plurality of codebooks include a set of files describing physical link topologies and configuration parameters associated therewith. The system may further include local storage on each of the plurality of modules, wherein codebooks associated with each of the plurality of modules are stored in the local storage. The system may further include a release file system associated with the system, wherein codebooks associated with the backplane are included in the release file system.

The link management system may further include a link manager component implemented on at least one of the plurality of modules and configured to manage data retrieval from the plurality of codebooks and determine the parameters therefrom, and a link servicer component implemented on remaining modules of the plurality of modules and configured to access local storage for an associated codebook of the plurality of codebooks and handle requests from the link manager component. The link manager component may be configured to, for a link of the plurality of links, obtain data from the plurality of codebooks on a per segment basis, compute an overall loss for the link based on the data per segment, and obtain the parameters based on the computed overall loss. The link manager component may be configured to continually monitor the plurality of links, and recalculate the parameters on any of the plurality of links based on any monitored changes. The link manager component may be configured to selectively disable any inactive links of the plurality of links. The link manager component may be configured to push the parameters to the link servicer component for implementation thereof. The link servicer component may be configured to set transmission power for the link based on the pushed parameters. Each of the plurality of links may include an electrical link defined by at least one segment, connectors disposed at segment boundaries, and transceivers at each end.

In another exemplary embodiment, a link management method includes, for a system, defining a codebook for each module, device, and interconnect in the system, the codebook including data describing physical link topologies and configuration parameters associated therewith; for initializing a link in the system, obtaining appropriate codebooks for each segment in the link; calculating an overall link loss for the link based on data in the appropriate codebooks; and obtaining configuration parameters for the link based on the overall link loss. The link management method may further include, for provisioned links in the system, monitoring link attributes, and selectively disabling inactive links based on the monitoring. The link management method may further include, for provisioned links in the system, monitoring link attributes for external and internal stimuli, and dynamically updating the configuration parameters of any of the provisioned links in the system based on any monitored external and internal stimuli. The link management method may further include providing a new module for the system, wherein the new module includes local storage with an associated codebook, and utilizing the new module in the calculating with the data from the associated codebook on the new module.

In yet another exemplary embodiment, a method of operating a high speed system includes operating a system including a plurality of circuits interconnected therein by a plurality of segments; for a new link between two circuits of the plurality of circuits, wherein the new link includes at least one segment of the plurality of segments, obtaining data for each of the at least one segment, performing a calculation based on the obtained data, and determining configuration parameters for the new link based on the calculation; for inactive segments of the plurality of segments, selectively disabling the inactive segments reducing power consumption of the system; and for any active segments of the plurality of segments, monitoring attributes associated therewith and dynamically updating configuration of any of the active segments based on any monitored external and internal stimuli. The method may further include, for a new module introduced subsequent to the system operating, obtaining data for segments using the new module from local storage on the new module. The obtaining data may include obtaining data associated with segments on modules from local storage associated therewith, and obtaining data associated with segments on backplane links from a database associated with a software release for the system.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Figure 1:
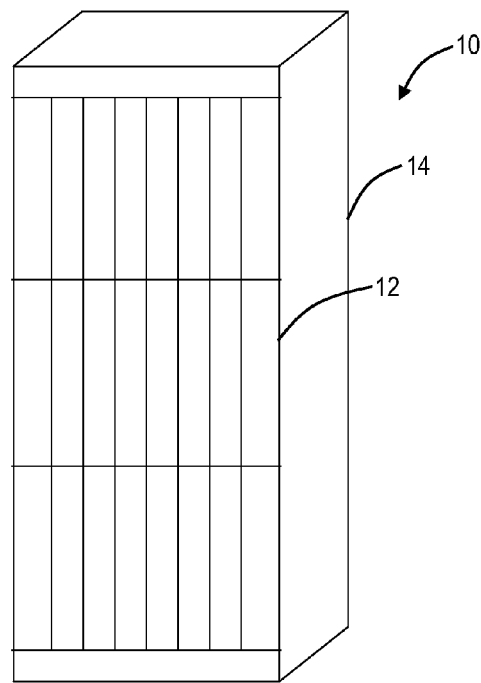
FIG. 1 is a diagram of a switching and/or processing system with a plurality of modules disposed therein.

In various exemplary embodiments, link management systems and methods are described within multi-stage, high-speed systems such as switches, routers, and the like. In an exemplary embodiment, the link management systems and methods are configured to calculate optimized configuration data for links based on preconfigured parameters stored in so-called codebooks, a presence or absence of one or more stages or modules, a type of hardware used at each stage, etc. The link management systems and methods also allow a deterministic order of bringing links up or down and handling run time changes to the links such as when different stages are removed or fail. The link management systems and methods may reevaluate on a real time basis all the above mentioned parameters to adjusts the links, if required. That is, the link management systems and methods make the process of link management dynamic, under the control of software/firmware, and triggered by external and internal stimuli.

The link management systems and methods assist in running links at a much higher speeds than previously possible leading to a larger switching and/or processing platforms on a similar footprint. The link management systems and methods provides a scalable and deterministic way to introduce new hardware in the field without requiring software upgrades, even though different link equalization parameters are needed. The link management systems and methods also help in reducing power consumption by keeping links powered down when they are not needed. The link management systems and methods decouple link initialization actions from the various link parameters and use a software algorithm to calculate and feed the link initialization parameters to the link initialization engine. Advantageously, the link management systems and methods future proof the switching and/or processing systems allowing introduction of new modules with different link characteristics in the field.

The link management systems and methods provide an algorithmic technique in managing equalization settings over high speed links. As described herein, the link management systems and methods provide techniques to obtain appropriate data (e.g., through the codebooks), to calculate overall links attributes (e.g., overall link loss), and to determine appropriate configuration parameters based thereon (e.g., equalization settings such as transmit equalization, transmit power levels, receiver settings, etc.). Additionally, the link management systems and methods focus on minimizing incremental effort whenever any part of a signal path is modified (e.g., on associated modules, backplanes, etc. For example, changes may occur when new designs (e.g., new modules with new printed circuit board (PCB)) are introduced (e.g., to provide increased functionality, new services, etc.). Further, changes may occur when current designs are modified or changed (e.g., a same module introduced with a new PCB dielectric material that alters associated electrical characteristics. The link management systems and methods are configured to minimize these associated changes.

As high speed systems grow to Tb/s speeds and beyond, a simple device driver approach does not work as proper equalization settings require more global information as opposed to only local information. Further, high speed systems are growing to thousands of electrical interconnects (i.e., links) contained therein. As such, hard coding every possible link topology is impractical. This approach was implemented in lower speed systems with fewer links. However, Tb/s+ systems have thousands and thousands of interconnects with differential pairs on a star wired backplane. For a high speed switch system, the number of table entries required in the hard coded implementation grows as a function of $P*Q*R$ where P is the number of line module types, Q is the number of backplane links times the number of backplane types, and R is the number of switch module types. Such a table can grow very large particularly if the table needs to accommodate intermediate vintages of product produced during the development process. The operation of older systems at lower speeds makes the link performance less sensitive to changes in the channel characteristic. For example, some systems, such as the Gb/s systems, do not have any transmit equalization settings at all.

Another approach may include using embedded hardware, a so-called back channel, and an embedded algorithm to allow transmit equalization to be adjusted dynamically either just at start up or possibly also on an ongoing basis. A backplane version of 10 gigabit Ethernet, 10 GBase-KR, provides support for this approach by including hooks in an auto-negotiation protocol to permit an algorithm running at the receiver to communicate adjustments to the transmitter to adjust equalization at start up. However, this approach burdens the circuit hardware with additional logic on every port to support the dynamic adjustment. In typical implementations, including 10 GBase-KR, these approaches require that the pairing of receive and transmit signal directions be maintained throughout the product platform. This pairing constraint can result in the need for increased signal routing layers most typically in the switch module routing which is undesirable due to impacts on cost, manufacturability, and long term PCB reliability.

In view of the foregoing, the link management systems and methods provide an algorithmic technique. Generally, a premise of the link management systems and methods is that some relatively simple parameters characterizing different pieces of the electrical channel can be combined algorithmically to determine the overall equalization settings without needing to perform analysis or calculations on a fully comprehensive electrical model of the channel. Thus, the link management systems and methods are an approximate technique avoiding an approach using a more complete model that would require large amounts of storage and be grossly burdensome for implementation on typical control processors.

After some analysis, it was determined that for the channels in a high speed system, a parameter characterizing the loss at a single critical frequency ($f_{baud}/2$) could be combined using a simple algorithm (summing) to determine the amount of equalization required and then to index into a simple, small table mapping the amount of equalization to tap settings for the transmit equalizer as well as providing any required adjustments for non-adaptive portions of the receiver. In an exemplary embodiment, the link management systems and methods include electrical channel characteristic data stored locally on each module in non-volatile storage. Note that the proposed methodology also enables transparent interoperability between different serializer-deserializer (SERDES) devices at each end of the link as each module is responsible for programming its own SERDES considering only parametric data describing the channel between the two devices.

The link management systems and methods are applicable to ultra high speed and complex electronic systems, i.e. overall system capacity of Tb/s+, individual link capacity in excess of 10 Gb/s, and thousands of segments forming links therein. In an exemplary embodiment, the link management systems and methods may apply to serial electrical data rates over 10 Gb/s, e.g. about 12 Gb/s. The link management systems and methods may further also apply to even greater data rates (e.g., 18-20 Gb/s serially) through increasing a number of frequency points at which loss is specified, e.g. from one data point to two data points.

Referring to FIG. 1, in an exemplary embodiment, a diagram illustrates a system 10 with a plurality of modules 12 disposed therein. The system 10 may further include a frame 14 with interconnects through which the plurality of modules 12 interconnect therebetween. The modules 12 may be referred to as line cards, blades, boards, plug-ins, and the like. The interconnects may include a backplane, a mid plane, and the like. Overall, the system 10 is configured to perform set of functions with different modules 12 utilized to realize the functions. For example, the system 10 may include a switch, a router, a cross-connect, a multiplexer, an aggregation platform, a supercomputer node, a server, a network element, etc. Of note, the system 10 includes a plurality of different modules 12 each with a plurality of links interconnecting one another in the system 10. In an exemplary embodiment, the system 10 is configured to process and/or switch data in excess of 1 Tb/s. Thus, internal to the system 10, there may be significant lengths of electrical interconnects within and between the modules 12. That is, the system 10 may include internal link interconnect complexity therein equivalent to a 1 Tb/s+ network. Further, in operation, the system 10 may be configured to operate with any number of modules 12 with the modules 12 being configurable in any number of slots or locations in the frame 14. Also, the system 10 may include empty slots that are unequipped during operation.

In an exemplary embodiment, the system 10 may include an optical switch that can consolidate the functionality of a multi-service provisioning platform (MSPP), digital cross connect (DCS), Ethernet and Optical Transport Network (OTN) switch, dense wave division multiplexing (DWDM) platform, etc. into a single, high-capacity intelligent switching system providing Layer 0, 1, and 2 consolidation. In another exemplary embodiment, the system 10 may include any of an OTN/SONET/SDH add/drop multiplexer, a multi-service provisioning platform (MSPP), a digital cross-connect (DCS), an optical cross-connect, a WDM/DWDM terminal, a switch, a router, and the like. That is, the system 10 may be referred to as a multistage switching network or a multistage processing network. Various architectures exists for switching systems, such as a Clos switch which partitions a large crossbar into a number of stages, thus reducing the complexity of the system 10 by decreasing the number of cross-points. In the following description, the link management systems and methods are described with reference to the system 10 being a high-speed switching system using a Clos switch in an exemplary embodiment. Those of ordinary skill in the art will recognize that the link management systems and methods contemplate use with the system 10 being any type of device. That is, the link management systems and methods may be implemented or used with any high-speed device on link interconnects disposed therein.

Figure 2:
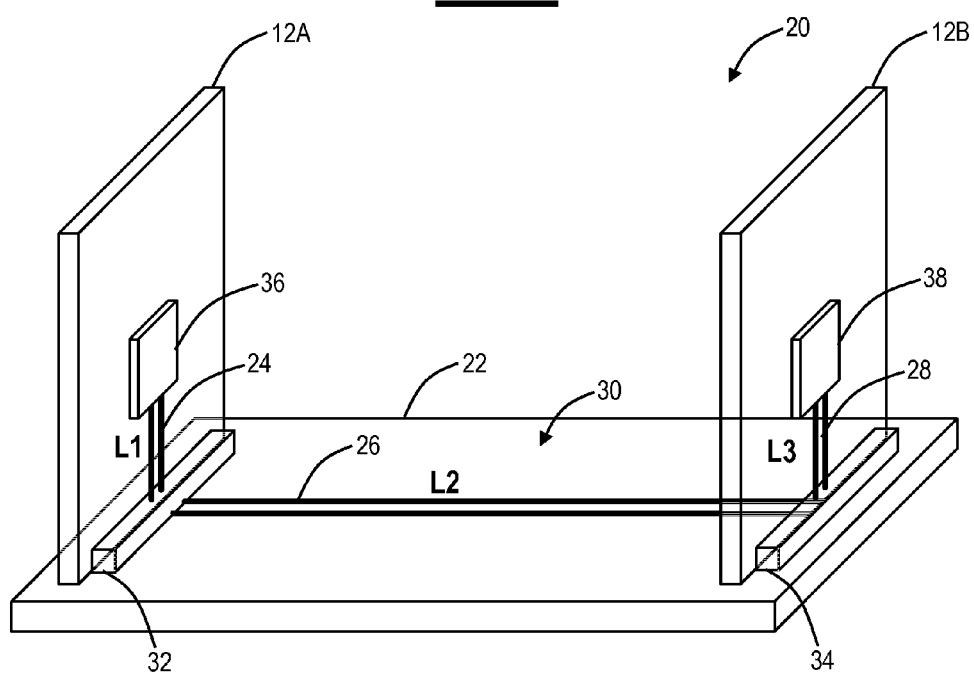
FIG. 2 is a diagram of a link segment in the system of FIG. 1 between two modules interconnected over a backplane and connectors disposed thereon.

Referring to FIG. 2, in an exemplary embodiment, a link segment 20 illustrates two modules 12A, 12B interconnected over a backplane 22. In a Clos switch or any other switch, different switching stages are connected to one another via high speed serial data segments 24, 26, 28. Note, the segments 24, 26, 28 collectively form a link 30 between the modules 12A, 12B. Each link 30 in the link segment 20 and the system 10 is logically divided into n segments 24, 26, 28 where n>0 in each stage. The number of segments 24, 26, 28 may be platform dependent and may be based on a minimum granularity needed. For example, in FIG. 2, the link 30 is divided into the three segments 24, 26, 28. The segment 24 (L1) is between an ingress stage device (e.g., the module 12A) to a connector 32 on the backplane 22. The segment 26 (L2) is on the backplane 22 between the connector 32 and another connector 34 associated with the module 12B. Finally, the segment 28 (L3) is between the connector 34 to the module 12B. In this example, a user could very well choose to divide the segments 24, 26, 28 into any other number (i.e., instead of the three depicted herein). The segment granularity all depends on the level of control that is needed to configure the links.

Of note, each of the segments 24, 26, 28 have some loss as signals travel thereon on. The loss may depend on length, printed circuit board (PCB) material, vias, device parastics, and several other factors. The link 30 (and all other links in the system 10) are initialized during a power-up sequence. Two ends 36, 38 of the data link (e.g., Transmitter and Receiver) are each initialized using initialization parameters. The initialization parameters needed for the link 30 may be hardware dependent and may include link loss, link polarity (i.e., inverted or not), maximum supported serial data rate, etc. Only using the initialization parameters works as long as the link 30 is at a relatively moderate speed. However, when the link 30 is run at very high speeds, the link 30 become more sensitive to link length (e.g., PCB traces, vias, etc.), connector types, PCB material, etc. Thus, it becomes more and more difficult to find the right set of initialization parameters that can be used to power up the links.

In various exemplary embodiment, the link management systems and methods are configured to calculate optimized configuration data for the link 30 (and other links in the system 10) based on preconfigured parameters, a presence or absence of one or more stages or modules, a type of hardware used at each stage, etc. The link management systems and methods also allow a deterministic order of bringing links up or down and handling run time changes to the links such as when different stages are removed or fail. The link management systems and methods may reevaluate on a real time basis all the above mentioned parameters to adjusts the links, if required. That is, the link management systems and methods make the process of link management dynamic, under the control of software/firmware, and triggered by external and internal stimuli.

Figure 3:
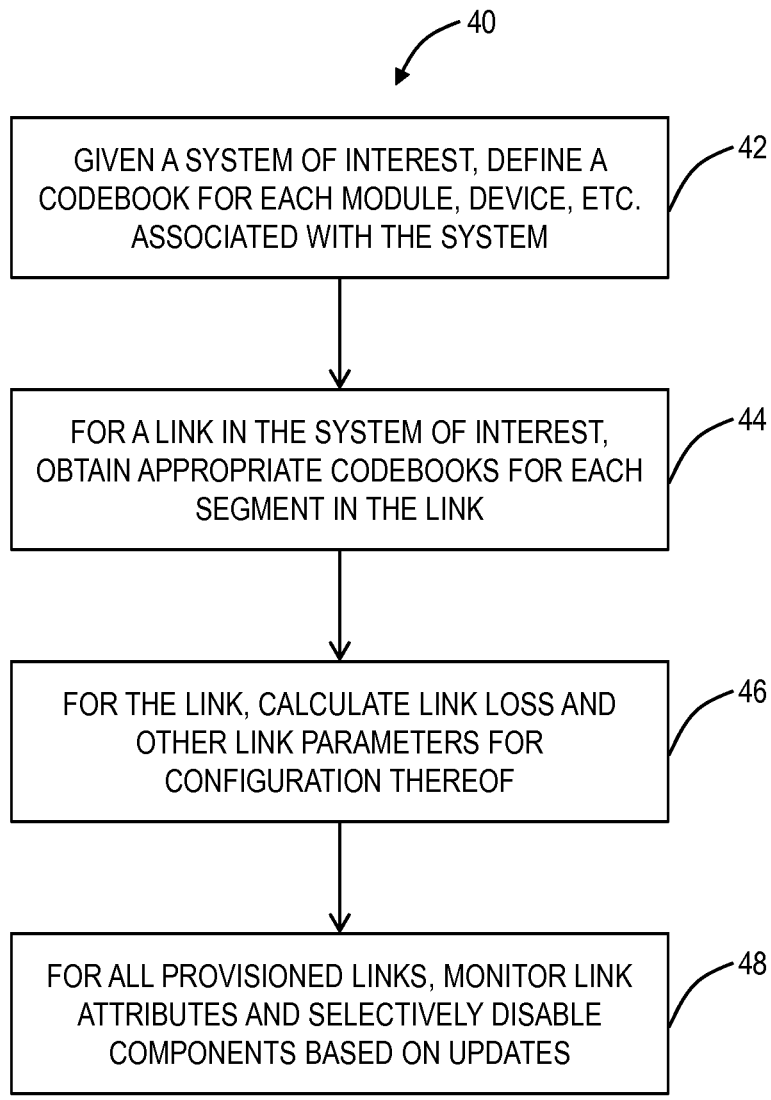
FIG. 3 is a flowchart of a link management method.

Referring to FIG. 3, in an exemplary embodiment, a flowchart illustrates a link management method 40. In an exemplary embodiment, the link management method 40 is implemented in the modules 12, in a controller module, in firmware, etc. of the system 10. In particular, the link management method 40 is configured to calculate optimized configuration data for any link in the system 10. First, given a system of interest such as the system 10, an equalizer codebook is defined for each module, device, etc. associated with the system (step 42). The link management method 40 utilizes the appropriate equalizer codebook for each segment to calculate transmit equalization and other device specific transmit and receive parameters. That is, the codebooks include data for an overall link calculation. In the example of FIG. 2, there are three link segments 24, 26, 28 so there should be three sets of codebooks with data available corresponding to each of the link segments 24, 26, 28. As described herein, the codebooks may include text files in CSV (comma-separated values) format that contain configuration information which is used to enable datapath links on devices.

For a link in the system of interest, the link management method 40 obtains the appropriate codebooks for each segment in the link (step 44). That is, the link management method 40 needs to plug in the right codebook data for each segment. This may include a two step lookup process. First, modules, devices, etc. with each segment may be queried to determine device type and an associated revision so that the right codebook data can be retrieved from a database. The database can either be packaged with a software install load or available in a well defined location that a user can provision. If the first step fails to find the codebook data, then the second step is to look for the codebook data in a local storage for the module, device, etc. The local storage could a on-board storage like a flash, non-volatile memory, a disc, etc. This two step approach has one key advantage in allowing the link management method 40 to override the codebook data for modules that are already deployed in the field without requiring any equipment reprogramming or returns. If it is found that there is better set of codebook data that could be used on a particular module, device, etc., then new software can be released with the codebook packaged with the software release. The two step lookup process will then use the codebook data that came with the software release.

With the appropriate codebooks obtained, the link management method 40 calculates link loss and other link parameters for configuration thereof (step 46). Here, the link management method 40 is configured to use data from the codebooks to calculate an overall link loss based on the segments, a maximum data rate of the link based on the segments, link polarity, and the like. With links provisioned in the system, the link management method 40 may also be configured to monitor active links for key information such as a presence indicator (i.e., is a module in a slot or not) and a failure state of all of the modules in the various active links (step 48). In an exemplary embodiment, the link management method 40 may selectively disable transmitters and receivers on modules participating in any active links that are taken down (e.g., via a failure, via removing a module, etc.). For example in FIG. 2, if the module 12B is removed, the link management method 40 may immediately disable the transmitter and receiver on the module 12A that has the other end of the link 30. Of note, this functionality of the link management method 40 of disabling inactive links advantageously saves significantly power consumption. For example, if the system 10 has 30 modules 12 and only 10 are equipped, i.e. 20 are unequipped, then forty links can be disabled reducing power consumption by more than 200 W.

Figure 4:
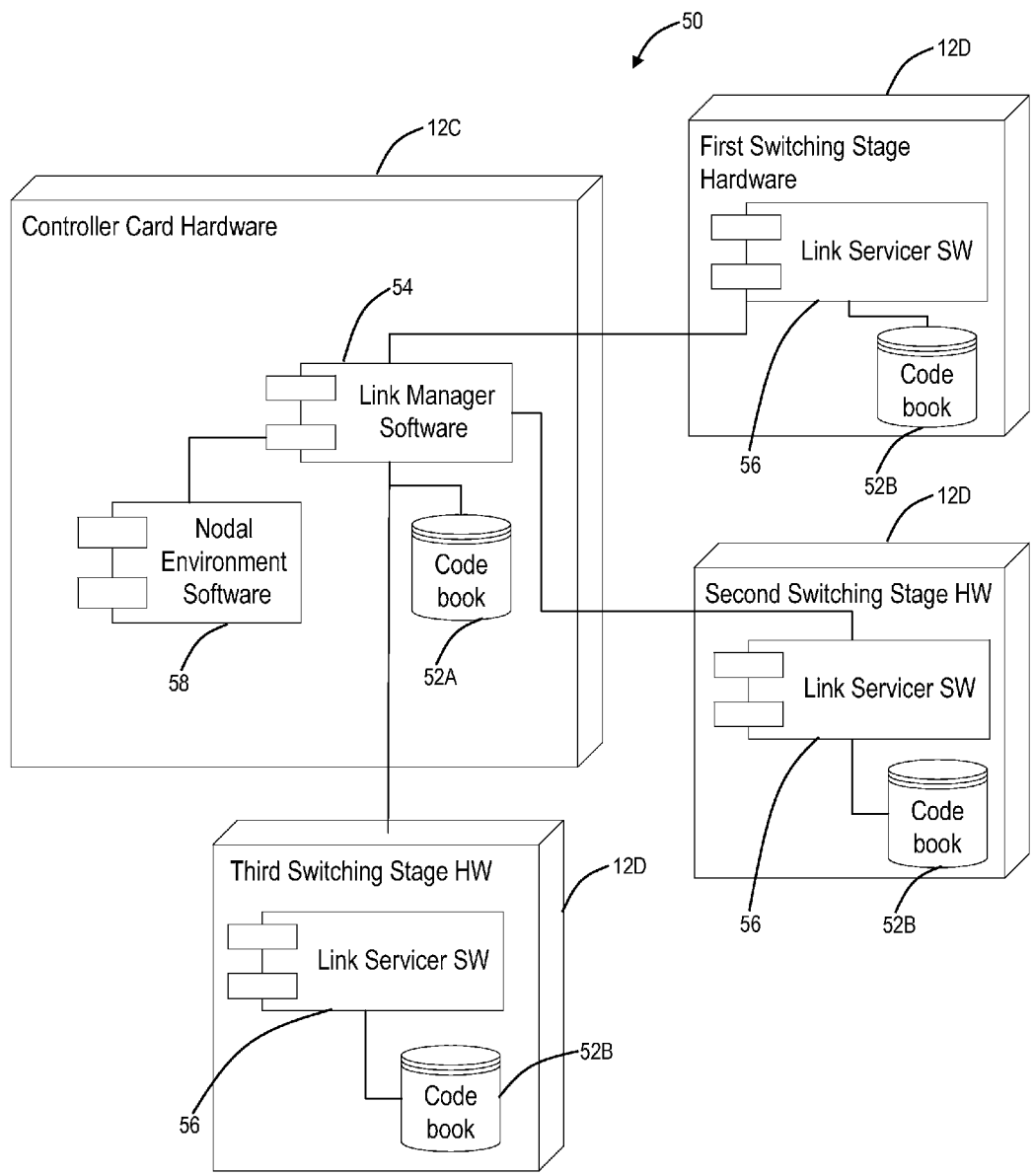
FIG. 4 is a diagram of a link management system associated with the system of FIG. 1 for implementing link management systems and methods.

Referring to FIG. 4, in an exemplary embodiment, a diagram illustrates a link management system 50 associated with the system 10 and/or the modules 12 for implementing the link management systems and methods. For example, the link management system 50 may be configured to implement the link management method 40. In the exemplary embodiment of FIG. 4, the link management system 50 is illustrated with a controller module 12C and three switching modules 12D. Those of ordinary skill in the art will recognize the link management system 50 may include any number of modules 12. Also, the system 10 may include any number of different types of modules 12. For example, one type of module may include the controller module 12C which may be configured to control and monitor functionality of the system 10, e.g. operations, administration, maintenance, and provisioning (OAM&P). Other exemplary types of modules may include the switching modules 12D, line modules, and the like. The controller module 12C includes a codebook 52A and the switching modules 12D each include a codebook 52B.

The link management system 50 includes a link manager software component 54 and a link servicer software component 56. The link management system 50 is configured to parses link topology and device configuration data from the codebooks 52, drive a link enable/disable process on module insertion/removal/HIR (hold in reset), and drive the link enable/disable process for module internal components on mode changes. Generally, the link manager software component 54 is a controller-side process that parses backplane topology and manages links between the modules 12 and manages all backplane-facing datapath links. The link servicer software component 56 is a module-side process that parses module internal topology and manages links between internal components on the module 12.

In an exemplary embodiment, the link manager software component 54 is deployed on the controller module 12C. If the controller module 12C is not available or in other exemplary embodiments, the link manager software component 54 may be deployed on any of the modules 12. The link manager software component 54 is configured to host software components that manage nodal for the link management systems and methods. For example, the link manager software component 54 may be configured to implement/control the link management method 40. Also, the controller modules 12C may also include nodal environment software 58. The software 58 is configured to control and operate all aspects of the system 10 and the functionality associated with each of the modules 12. For example, the software 58 may be the software install load with the database for codebook data.

The link manager software component 54 is configured to load a common backplane codebook from the codebook 52A, and load module states (e.g., present, failed) for every module 12 in the system 10. In an exemplary embodiment, the module states may be determined from the nodal environment software 58 which may monitor module status for OAM&P. If a new link is needed in the system 10, the link manager software component 54 may be configured to implement the link management method 40. For example, the link manager software component 54 can initiate a codebook data retrieval from each of the modules 12D. This may include either retrieving data from the codebooks 52B on the modules 12D, retrieving module type, revision number, etc. and retrieving data from the codebook 52A on the module 12C, or querying the database based on the module type, revision number, etc.

With all of the codebook data, the link manager software component 54 is configured to evaluate/calculate link parameters for each link segments and derive the total link loss. The link manager software component 54 then pushes the calculated link loss to the link servicer software components 56 in a right order (based on the link segment topology), as required by the hardware specifications. Also, the link manager software component 54 can verify that the links are enabled and publish this information so that other software components can now use the links to set up connections. The link manager software component 54 also can continue to monitor, on real time basis, all the modules 12 and recalculate associated link parameters for any new environment changes. Further, the link manager software component 54 can also handle any failures reported by any of the link servicer software components 56 and raise alarms for such failures.

The link servicer software components 56 is usually deployed on the modules 12D. That is, the link manager software component 54 may be considered a master on the controller module 12C, and the link servicer software components 56 may be considered as a slave on other modules 12D. Also, the link servicer software components 56 could be deployed as a proxy on the controller module 12C. The link servicer software components 56 are configured to access codebook data from the codebook 52B via an onboard flash or from a persistent database, handle activate and deactivate links requests from the link manager software component 54, and provide feedback to the link manager software component 54 for error scenarios such as a codebook read failure, link enable/disable failure, etc.

Figure 5:
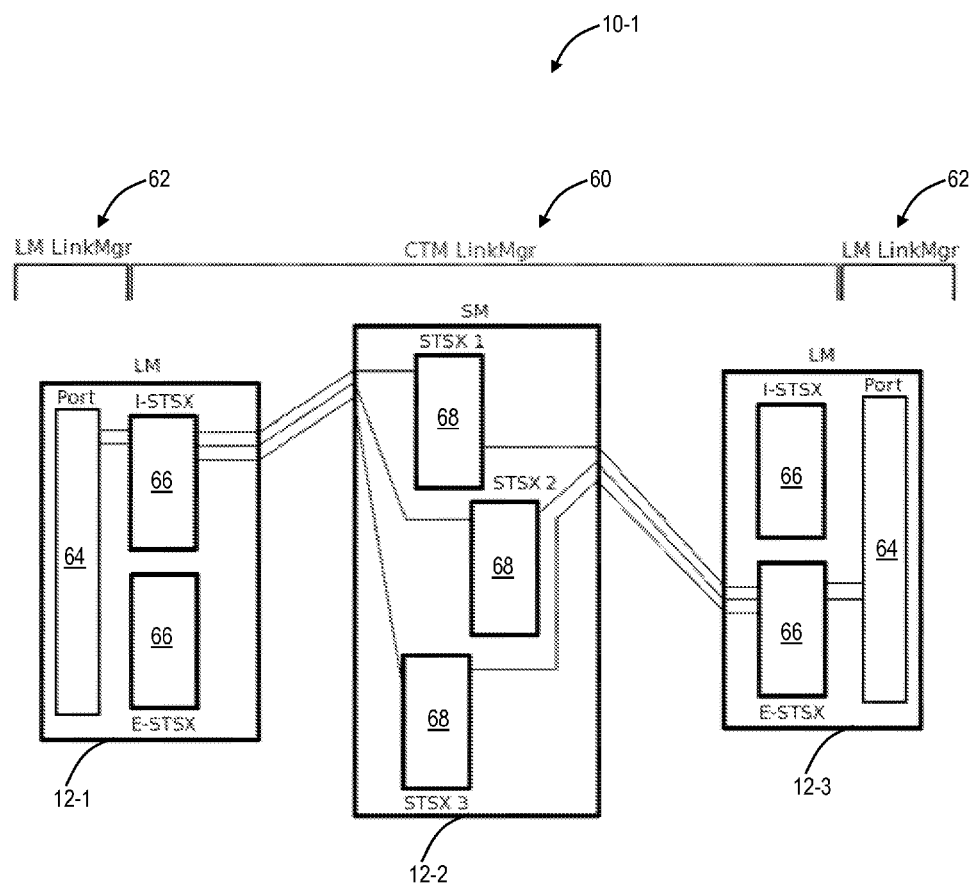
FIG. 5 is a diagram of a system three modules included therein operating the link management system of FIG. 4.

Referring to FIG. 5, in an exemplary embodiment, a diagram of a system 10-1 is illustrated with three modules 12-1, 12-2, 12-3 included operating the link management system 50. The system 10-1 is an exemplary three-stage switch with the modules 12-1, 12-3 being line modules or ingress/egress stages, and the module 12-2 being a switch module or center stage. The system 10-1 may include a controller link manager 60 and a line module link manager 62 with the requisite area of control over the modules 12 illustrated in FIG. 5. The controller link manager 60 may include the link manager software component 54 and all of the associated functionality. The line module link manager 62 may include the link servicer software components 56 and all of the associated functionality. The modules 12-1, 12-3 include ports 64 and switching circuitry 66. The controller link manager 60 includes software classes which parse, validate, and cache codebook data. The controller link manager 60 further includes a module state machine which drives the action based on module state transitions. The line module link manager 62 includes software classes which parse, validate, and cache internal codebook data for the line modules 12-1, 12-3. The line module link manager 62 also monitors for port mode changes and then drives link enable/disable on mode change.

The ports 64 provide physical interfaces to the system 10-1, e.g. optical, electrical, etc., and the switching circuitry 66 may include a first/third stage switch. The modules 12-2 include switching circuitry 68. As described herein, a link may be formed through the system 10-1 based on a plurality of segments. A datapath through the system 10-1 may traverse the entire three-stage architecture through the various switching circuitry 66, 68. As described herein, the datapath links between stages may have different lengths due to module placement, PCB design, etc. Also as described herein, in order to initialize the dataplane for a given module, the links must be enabled with calculated/determined configuration parameters. The configuration parameters used during link enabling/disabling are determined based on total path loss, and these configuration parameters configure equalization functionality on a per-link basis. The configuration parameters are provided via the codebooks.

Figure 6:
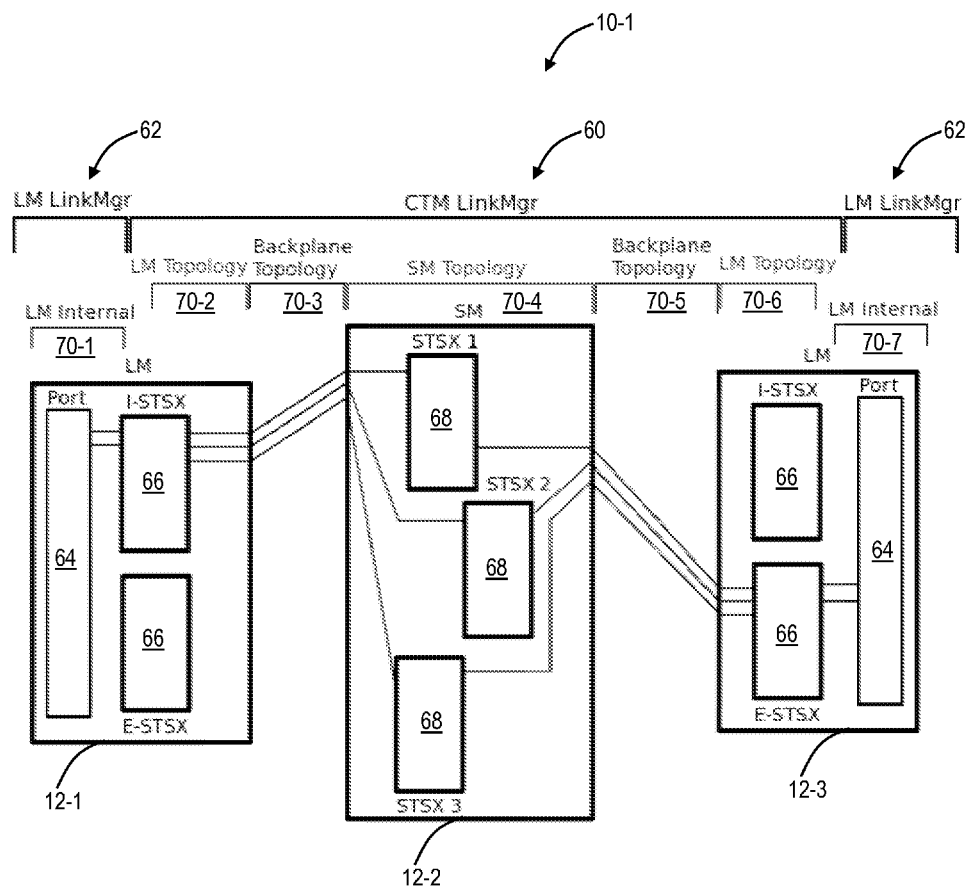
FIG. 6 is a diagram of the system of FIG. 5 illustrating exemplary codebooks for the link management system.

Referring to FIG. 6, in an exemplary embodiment, a diagram of the system 10-1 illustrates exemplary codebooks 70 for the link management system 50. As described herein, the codebooks 70 are essentially a set of files describing the physical link topology between devices on a module and links between modules (on the backplane). The set of files contain configuration parameters for each device whose dataplane links will be enabled by the link management system 50. The exemplary system 10-1 includes seven codebooks including internal line module codebooks 70-1, 70-7; line module topology codebooks 70-2, 70-6; backplane topology codebooks 70-3, 70-5; and a switch module topology codebook 70-4. Further, embedded within the codebooks 70-1, 70-2, 70-4, 70-6, 70-7, there may be device configuration codebooks that contain data specific to each datapath in these devices (e.g., over the circuitry 66, 68, the ports 64, etc.).

In an exemplary embodiment, the backplane topology codebooks 70-3, 70-5 are distributed with a release file system (e.g., the nodal environment software 58). It is expected that the backplane topology codebooks 70-3, 70-5 relate to relatively unchanging equipment, i.e. the physical backplanes in the system 10. The codebooks 70-1, 70-2, 70-4, 70-6, 70-7 may be distributed in memory stored on the physical modules 12-1, 12-2, 12-3, or with the release file system (where the data is looked up based on module type, revision number, etc.). In an exemplary embodiment, the memory stored on the physical modules 12-1, 12-2, 12-3 includes flash memory, non-volatile memory, etc. Additionally, the link management system 50 may include an override/update mechanism to allow codebook 70 updates to existing hardware. For example, the link management system 50 may obtain the codebooks 70 from either the release file system or the memory on the physical modules 12-1, 12-2, 12-3. Here, the link management system 50 may verify that the codebook 70 in the memory is the same as a similar codebook in the release file system. If not, the link management system 50 may utilize the most up to date version (which is likely part of the release file system) and/or update the memory accordingly. In another exemplary embodiment, the link management system 50 may be configured, upon a software update of the release file system, to update any of the codebooks 70 in the memory as needed.

Figure 7:
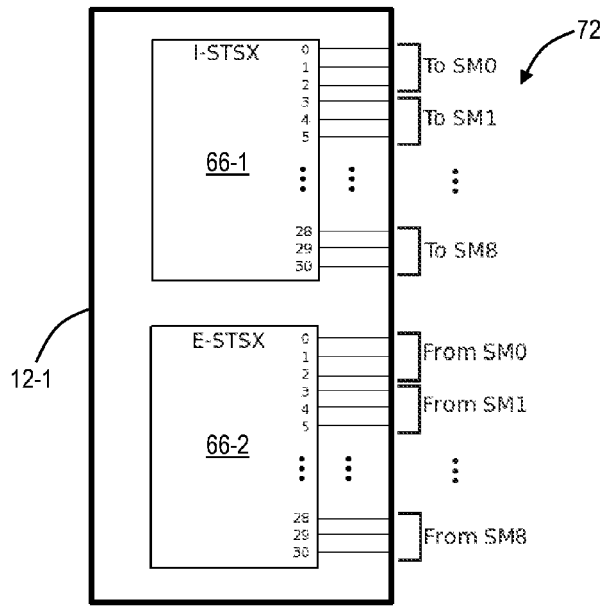
FIGS. 7 and 8 are diagrams of exemplary link topologies codebooks from FIG. 6 for line module topology codebooks (FIG. 7) and a switch module topology codebook (FIG. 8)
Figure 8:
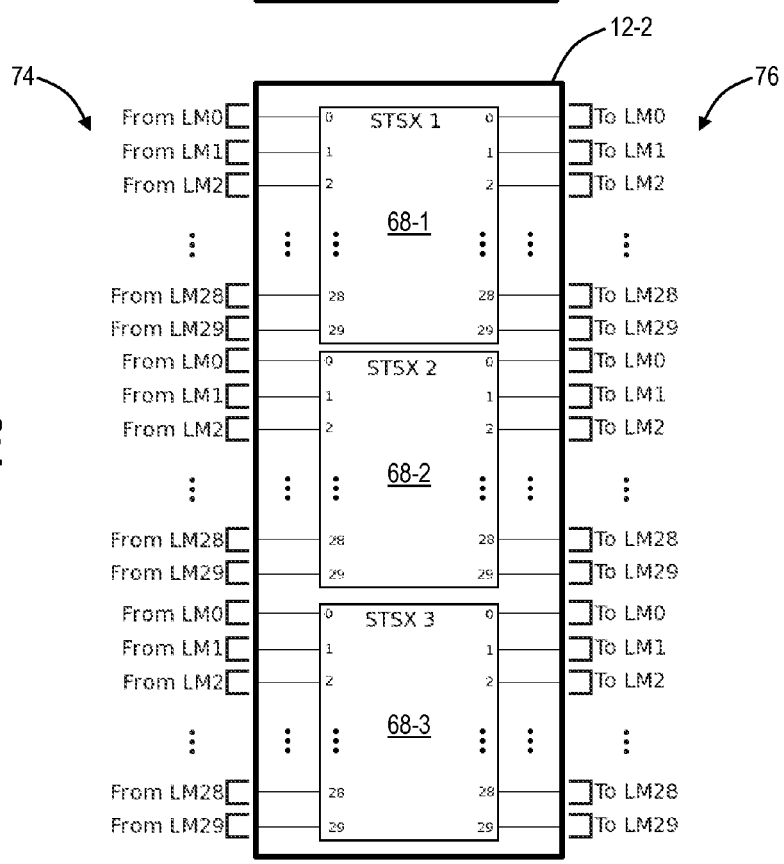

Referring to FIGS. 7 and 8, in an exemplary embodiment, diagrams illustrate exemplary link topologies for the line module topology codebooks 70-2, 70-6 (FIG. 7) and the switch module topology codebook 70-4 (FIG. 8). The codebook link topology refers to a physical layout of links on a board/circuit. In an exemplary embodiment, the links may be referred to by a logical or physical number. The codebooks 70 provide enough information that a logical-to-physical mapping can be created by the link management system 50. FIG. 7 illustrates the codebook 70-2 for the module 12-1. The module 12-1 includes circuitry 66-1, 66-2 acting as ingress and egress switches. Each of the circuitry 66-1, 66-2 has segments 72 to/from other modules such as the module 12-2 or other switch modules. In an exemplary embodiment, each of the circuitry 66-1, 66-2 includes three segments to each separate switch module (SM0 . . . SM8). FIG. 8 illustrates the codebook 70-4 for the module 12-2. The module 12-2 includes circuitry 68-1, 68-2, 68-3 each acting as a center stage switch. Each of the circuitry 68-1, 68-2, 68-3 has segments 74 from line modules (such as the modules 12-1, 12-3) and segments 76 to the line modules (such as the modules 12-1, 12-3). In an exemplary embodiment, the system 10-1 may support 30 line modules each with three connections per switch module as shown in FIG. 8. As noted herein, FIGS. 5-8 are presented herein for illustration purposes, and the link management systems and methods contemplate operation on any type of module 12 with any type of links and/or segments therebetween.

Figure 9:
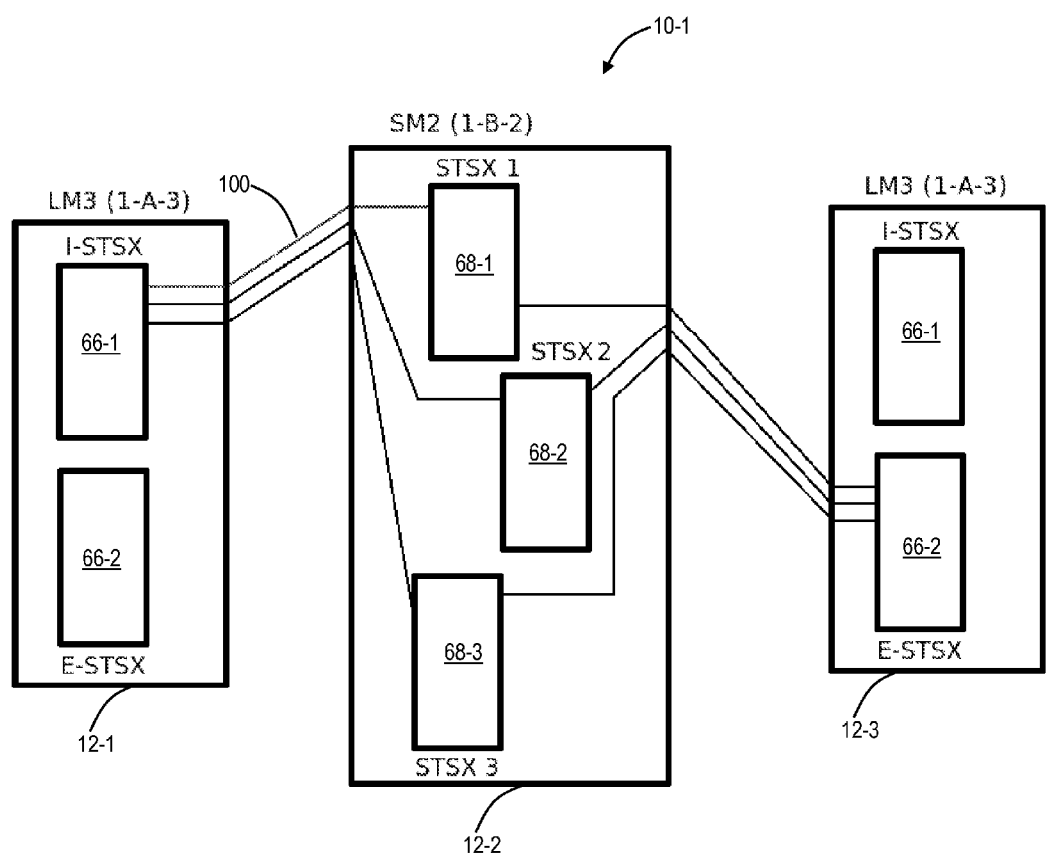
FIGS. 9-12 are diagrams of an exemplary codebook operation in the system of FIG. 5.
Figure 10:
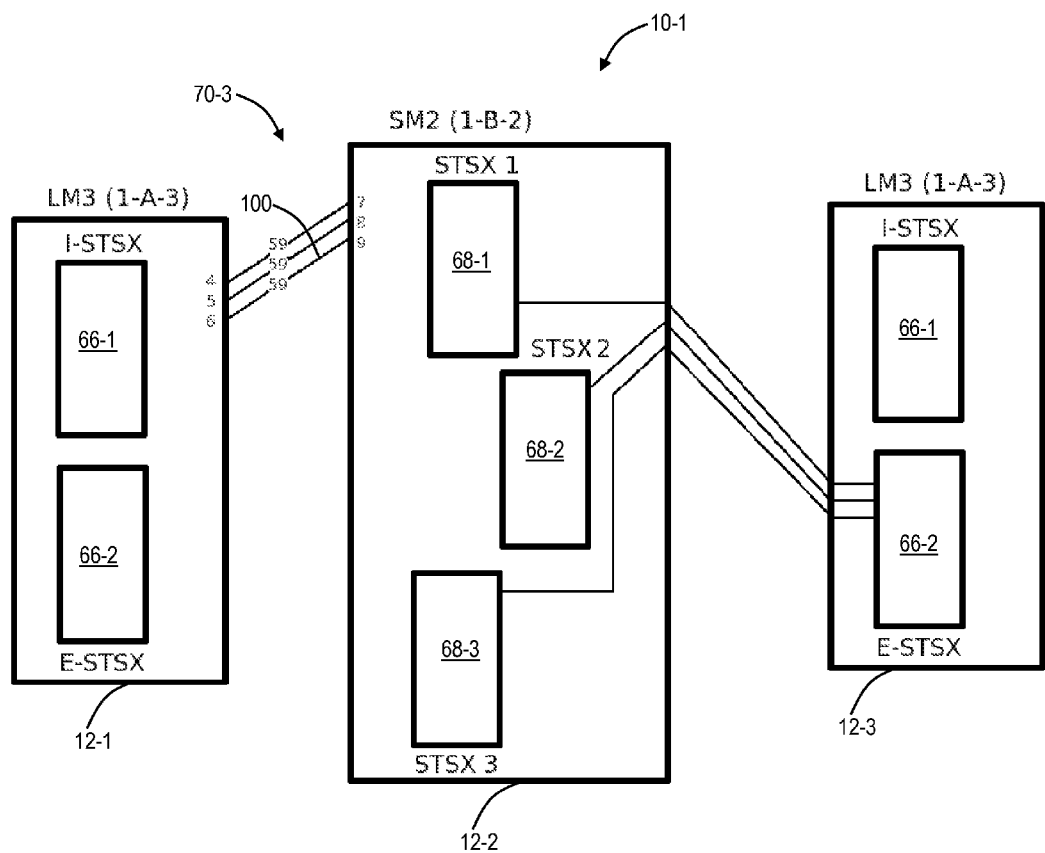
Figure 11:
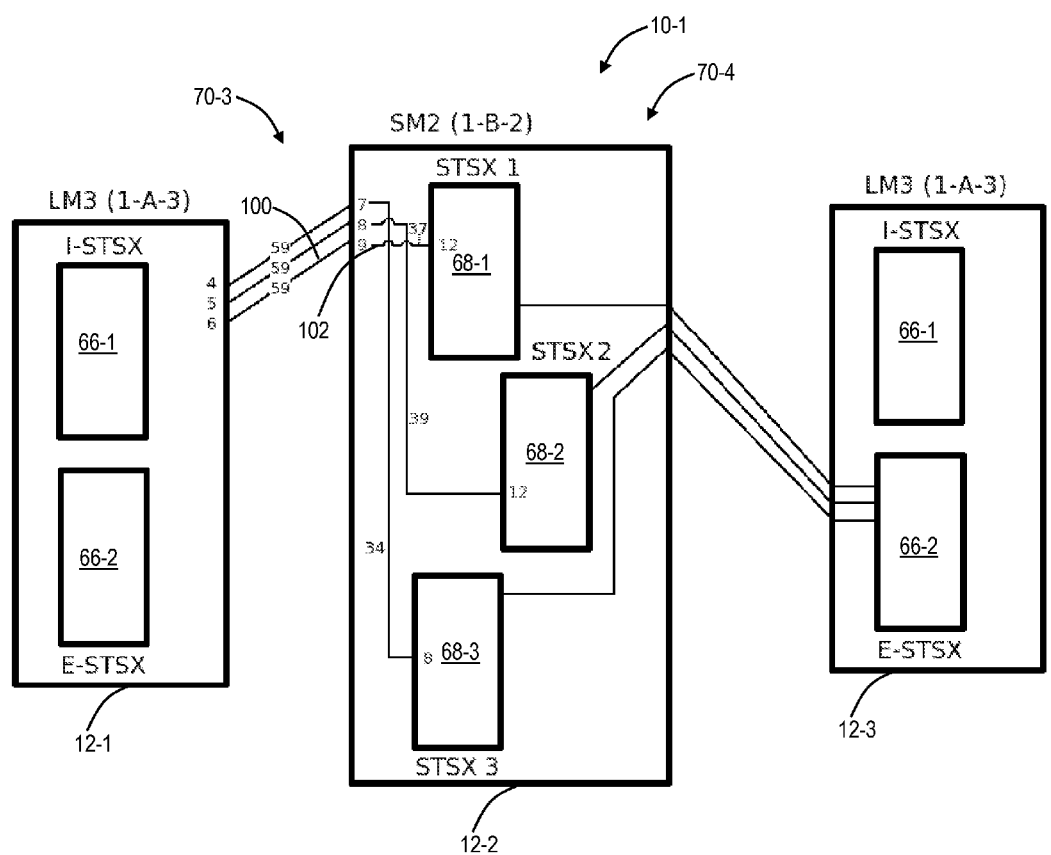
Figure 12:
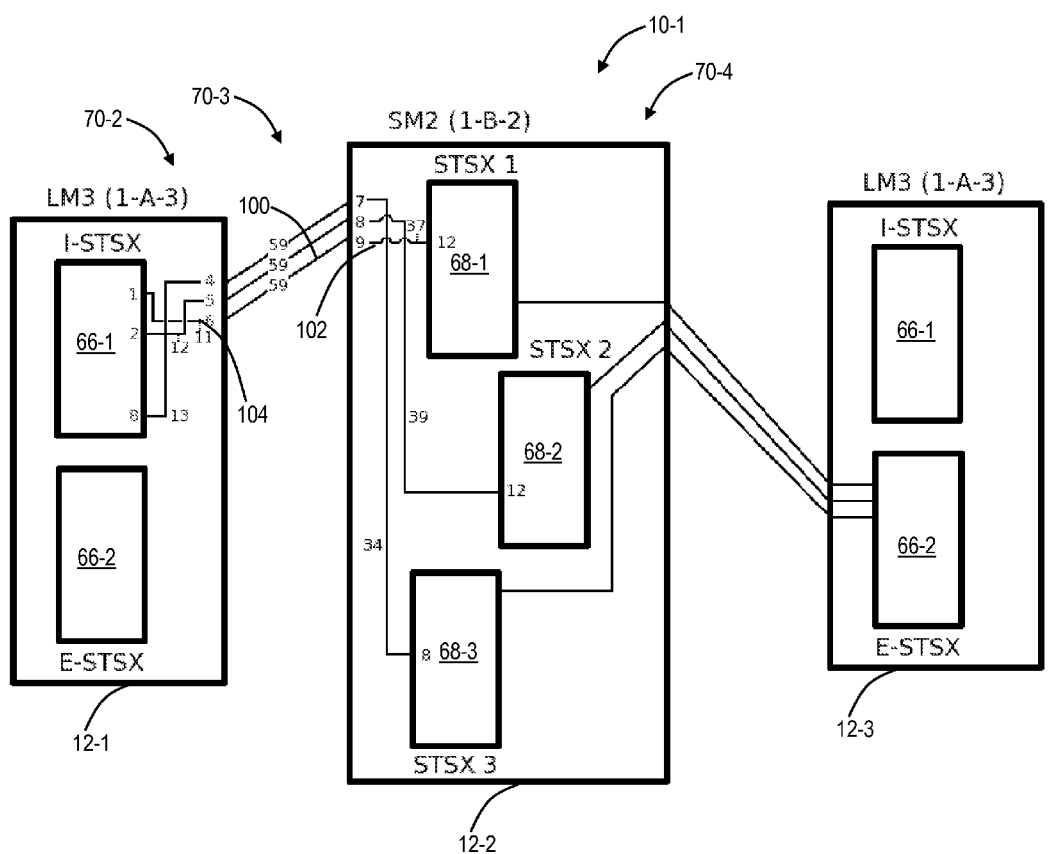

Referring to FIGS. 9-12, in an exemplary embodiment, an exemplary codebook operation in the system 10-1 is illustrated using the link management system 50 and the controller link manager 60 to determine parameters for a link 90. FIG. 9 illustrates a logical diagram of the link 90 between the circuitry 66-1 on the module 12-1 to the circuitry 68-1 on the module 12-2. FIGS. 10-12 illustrate physical diagrams of the link 90 and associated segments 100, 102, 104. The link 90 includes the three segments 100, 102, 104, and the link management system 50 utilizes the codebooks 70-2, 70-3, 70-4 to look up losses and calculate a total loss for the link 90 followed by a look up of the appropriate configuration parameters based on the total loss.

FIG. 10 illustrates the system 10-1 with the codebook 70-3. For example, the following table is an example of the codebook 70-3 for the Backplane Link Topology.

```
# Backplane Link Topology Table
# START OF METADATA
TYPE    1
REV     1
NROW    1620
```

| HEAD | TXCard | TXSlot | TXLink | RXCard | RXSlot | RXLink | Fabric Type | LossFIG. |
|------|--------|--------|--------|--------|--------|--------|-------------|----------|
| MIN  | LM     | 1      | 1      | LM     | 1      | 1      | DATA        | 0        |
| MAX  | SM     | 30     | 90     | SM     | 30     | 90     | TDM         | 100      |
| ...  |        |        |        |        |        |        |             |          |
| DATA | LM     | 3      | 1      | SM     | 1      | 7      | TDM         | 59       |
| DATA | LM     | 3      | 2      | SM     | 1      | 8      | TDM         | 59       |
| DATA | LM     | 3      | 3      | SM     | 1      | 9      | TDM         | 59       |
| DATA | LM     | 3      | 4      | SM     | 2      | 7      | TDM         | 59       |
| DATA | LM     | 3      | 5      | SM     | 2      | 8      | TDM         | 59       |
| DATA | LM | 3 | 6 | SM | 2 | 9 | TDM   | 59   |
| DATA | LM     | 3      | 7      | SM     | 3      | 7      | TDM         | 63       |
| DATA | LM     | 3      | 8      | SM     | 3      | 8      | TDM         | 63       |
| ...  |        |        |        |        |        |        |             |          |

The codebook 70-3 may include a type indicator (indicative of a type of codebook), a revision (REV) indicator (indicative of whether the codebook 70-3 is current), a number of rows indicator (NROW) for determining a size of the codebook 70-3, and data rows. The data rows may include a first two rows which are a minimum and maximum value for the codebook 70-3 (in this case, slots=min of 1, max of 30; links=min of 1, max of 90; a fabric type, e.g., DATA, TDM, etc.; and loss figures=min of 0, max of 100). In this example, the codebook operation is concerned with a segment 100 between TXLink 6 of the module 12-1 and RXLink 9 of the module 12-2, and per the highlighted section of the codebook 70-3, this segment includes a loss figure of 59.

FIG. 11 illustrates the system 10-1 with the codebook 70-4. For example, the following table is an example of the codebook 70-4 for the switch module topology.

The codebook 70-4 may include a type indicator (indicative of a type of codebook), a revision (REV) indicator (indicative of whether the codebook 70-4 is current), a number of rows indicator (NROW) for determining a size of the codebook 70-4, and data rows. The data rows may include a first two rows which are a minimum and maximum value for the codebook 70-4 (in this case, direction=egress or ingress, transceiver (Xcvr)=FE or STSX, link=1 . . . 90, Inverse Polarity=0 . . . 1, max data rate=1562 . . . 6520, loss figure=0 . . . 100, transceiver number=1 . . . 3, and transceiver port=1 . . . 96). In this example, the codebook operation is concerned with a segment 102 on link 9 to transceiver port 12, and per the highlighted section of the codebook 70-4, this segment includes a loss figure of 37.

FIG. 12 illustrates the system 10-1 with the codebook 70-2. For example, the following table is an example of the codebook 70-2 for the line module topology.

```
# Switch Module Topology Table
# START OF METADATA
TYPE    2
REV     2
NROW    180
```

| HEAD | Direction | Xcvr | Link | InvPolar | MaxData | LossFIG. | XcvrNo | XcvrPort |
|------|-----------|------|------|----------|---------|----------|--------|----------|
| MIN  | EGRESS    | FE   | 1    | 0        | 1562    | 0        | 1      | 1        |
| MAX  | INGRESS   | STSX | 90   | 1        | 6520    | 100      | 3      | 96       |
| ...  |           |      |      |          |         |          |        |          |
| DATA | INGRESS   | STSX | 1    | 1        | 6520    | 36       | 2      | 11       |
| DATA | INGRESS   | STSX | 2    | 1        | 6520    | 38       | 1      | 11       |
| DATA | INGRESS   | STSX | 3    | 0        | 6520    | 37       | 3      | 3        |
| DATA | INGRESS   | STSX | 4    | 1        | 6520    | 37       | 1      | 10       |
| DATA | INGRESS   | STSX | 5    | 0        | 6520    | 36       | 3      | 4        |
| DATA | INGRESS   | STSX | 6    | 0        | 6520    | 40       | 2      | 2        |
| DATA | INGRESS   | STSX | 7    | 0        | 6520    | 34       | 3      | 8        |
| DATA | INGRESS   | STSX | 8    | 1        | 6520    | 39       | 2      | 12       |
| DATA | INGRESS | STSX | 9 | 1 | 6520 | 37 | 1 | 12 |
| DATA | INGRESS   | STSX | 10   | 1        | 6520    | 40       | 2      | 16       |

| # Line Module Topology Table | | | | | | | | |
|---|---|---|---|---|---|---|---|---|
| # START OF METADATA | | | | | | | | |
| TYPE | 3 | | | | | | | |
| REV | 1 | | | | | | | |
| NROW | 64 | | | | | | | |
| HEAD | Direction | Xcvr | Link | InvPolar | MaxData | LossFIG. | XcvrNo | XcvrPort |
| MIN | EGRESS | FE | 1 | 0 | 6520 | 0 | 1 | 1 |
| MAX | INGRESS | STSX | 32 | 1 | 6520 | 100 | 2 | 32 |
| ... | | | | | | | | |
| DATA | INGRESS | STSX | 1 | 0 | 6520 | 12 | 1 | 3 |
| DATA | INGRESS | STSX | 2 | 0 | 6520 | 13 | 1 | 4 |
| DATA | INGRESS | STSX | 3 | 0 | 6520 | 13 | 1 | 5 |
| DATA | INGRESS | STSX | 4 | 0 | 6520 | 13 | 1 | 8 |
| DATA | INGRESS | STSX | 5 | 0 | 6520 | 12 | 1 | 2 |
| DATA | INGRESS | STSX | 6 | 0 | 6520 | 11 | 1 | 1 |
| DATA | INGRESS | STSX | 7 | 0 | 6520 | 12 | 1 | 6 |

The codebook 70-2 may include a type indicator (indicative of a type of codebook), a revision (REV) indicator (indicative of whether the codebook 70-2 is current), a number of rows indicator (NROW) for determining a size of the codebook 70-2, and data rows. The data rows may include a first two rows which are a minimum and maximum value for the codebook 70-4 (in this case, direction=egress or ingress, transceiver (Xcvr)=FE or STSX, link=1 . . . 32, Inverse Polarity=0 . . . 1, max data rate=6520 . . . 6520, loss figure=0 . . . 100, transceiver number=1 . . . 2, and transceiver port=1 . . . 32). In this example, the codebook operation is concerned with a segment 104 on link 6 to transceiver port 1, and per the codebook 70-2, this segment includes a loss figure of 11.

With the segments 100, 102, 104 determined, a total loss value is determined for the link, and a loss index may be calculated to identify a set of link enable parameters. For example, total loss=107=59+37+11. A formula for the loss index may be equal to floor((total loss)/4)=floor(107/4) =floor(26.75)=26, so 26 may be a loss index for finding the correct link enable parameters. The following table illustrates a configuration table where the loss index may be utilized to look up the correct link enable parameters.

Figure 13:
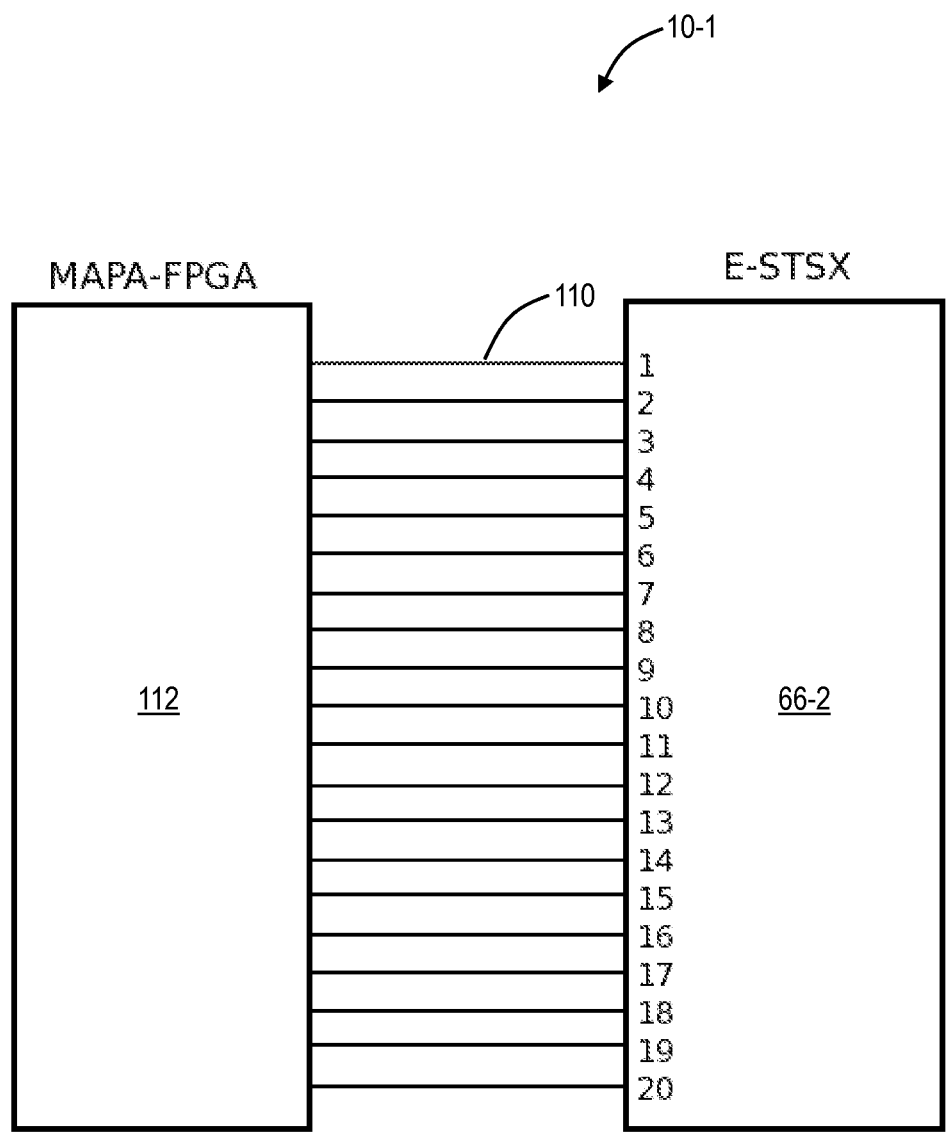
FIGS. 13-14 are diagrams of another exemplary codebook operation in the system of FIG. 5.
Figure 14:
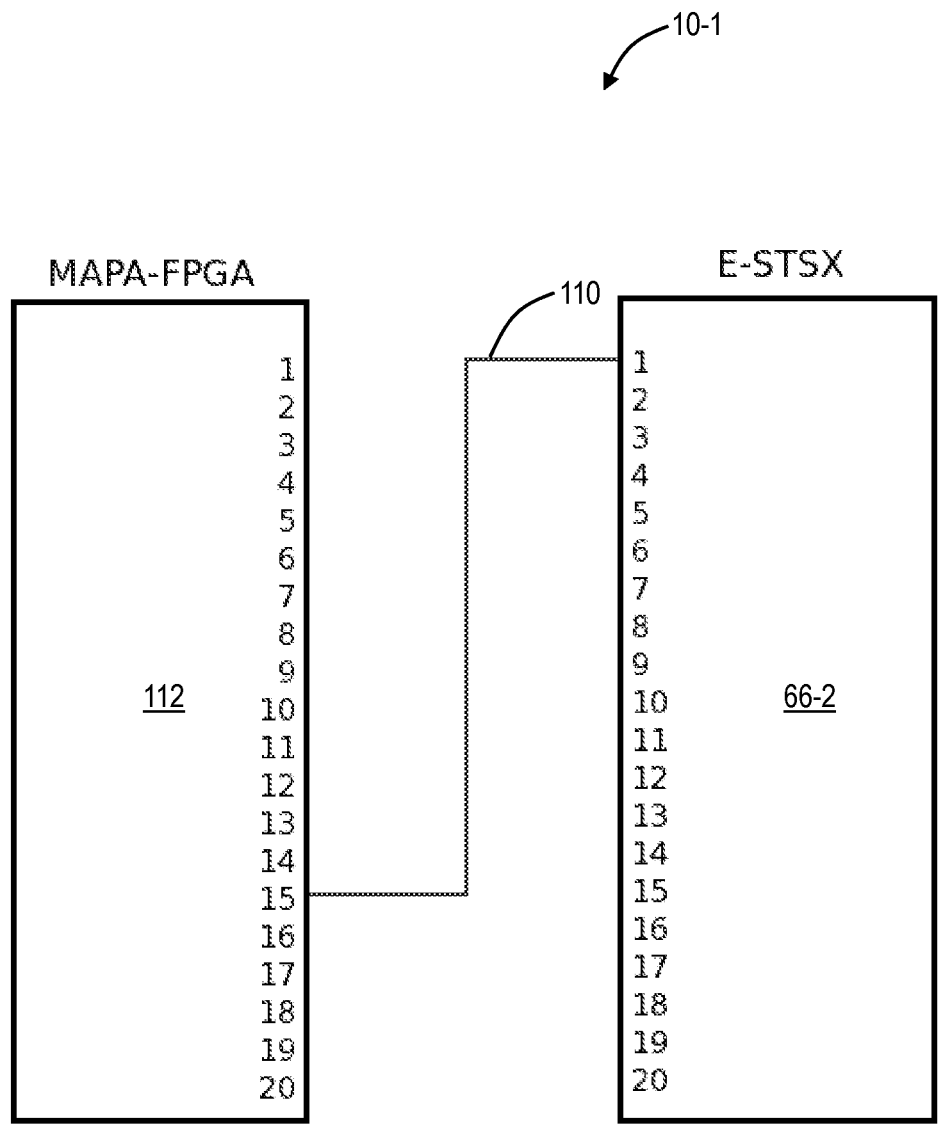

Referring to FIGS. 13 and 14, in an exemplary embodiment, an exemplary codebook operation in the system 10-1 is illustrated using the link management system 50 and the controller link manager 60 to determine parameters for a link 110. In this example, the codebook 70-1 for the internal line module topology is used. FIG. 13 illustrates a logical diagram of the link 110, and FIG. 14 illustrates a physical diagram of the link 110. The link 110 may be from the circuitry 66-2 on the module 12-1 to a field programmable gate array 112 associated with a port. For example, the following table is an example of the codebook 70-1 for the internal line module topology.

| # Configuration Table | | | | | | | | | |
|---|---|---|---|---|---|---|---|---|---|
| # START OF METADATA | | | | | | | | | |
| TYPE | 2 | | | | | | | | |
| REV | 1 | | | | | | | | |
| NROW | 35 | | | | | | | | |
| HEAD | LossIndex | FFEMode | C0 | C1 | C2 | C3 | TXPow | SlewRt | DFEMode ... |
| MIN | 10 | 0 | -15 | 0 | -31 | -15 | 0 | 0 | 0 |
| MAX | 44 | 3 | 15 | 63 | 31 | 15 | 127 | 1 | 3 |
| # LossIndex describes total channel loss in units of 0.4 dB | | | | | | | | | |
| ... | | | | | | | | | |
| DATA | 23 | 1 | -9 | 63 | -17 | 0 | 74 | 0 | 0 |
| DATA | 24 | 1 | -9 | 63 | -18 | 0 | 76 | 0 | 0 |
| DATA | 25 | 1 | -10 | 63 | -18 | 0 | 77 | 0 | 0 |
| DATA | 26 | 1 | -10 | 63 | -18 | 0 | 78 | 0 | 0 |
| DATA | 27 | 1 | -10 | 63 | -19 | 0 | 82 | 0 | 0 |

With the loss index of 26, the operation now has the appropriate configuration settings for the link of the segments 100, 102, 104.

| # Line Module Internal Topology Table | | | | |
|---|---|---|---|---|
| # START OF METADATA | | | | |
| TYPE | 7 | | | |
| REV | 1 | | | |
| NROW | 160 | | | |
| # CONFIG FILE | SerDesType | TTYP | TREV | DREV |
| CONFIG_DATA | STSX | 8 | 1 | 1 |
| CONFIG_DATA | FPGA1 | 11 | 1 | 2 |
| CONFIG_DATA | FPGA2 | 12 | 1 | 2 |

-continued

```
# FIELD METADATA
HEAD            DeviceName       PortGrp  Dir       SerDesPt  SerDesType  ...  ConfigIndex
DATA            EGRESS_STSX         1     TX           1      STSX                  6
DATA            MAPA_FPGA           1     RX          15      FPGA1                 2
```

The last two data rows include all information needed to find the proper configuration values for the link 110. Note that in the codebook 70-1, a TX/RX pair for a given link is uniquely identified by its Interface (here EGRESS_STSX-MAPA_FGPA), and the like. These two rows indicate that the logical link in question (FIG. 13) originates from port 1 on the STSX and terminates on port 15 of the MAPA_FPGA. So, the physical link in question is illustrated in FIG. 14. Having found the rows pertaining to the link 110, this data contained therein is used to look up the actual link configuration parameters. On the second to last row, it is shown that the SerDesType given is STSX. Near the top of the file, it is shown a CONFIG_DATA line whose CONFIG_FILE is STSX. This line indicates that the configuration file for the STSX SerDesType has a TTYP (Table Type) of 8, TREV (Table Revision) of 1, and DREV (Data Revision) of 1. With this information, and referring back to the second to last row, the ConfigIndex for the STSX side of the link is 6. A configuration table is illustrated below for the STSX side.

```
# STSX Configuration Table
# START OF METADATA
TYPE          8
TREV          1
NROW         15
HEAD      ConfigIndex  FFEMode    C0    C1    C2    C3   TXPow   SlewRt   DFEMode ...
MIN           0           0      -15     0   -31   -15     0       0         0
MAX          14           3       15    63    31    15   127       1         3
# START OF DATA
DATA          4           1       -1    63    -8     0    86       0         0
DATA          5           1       -2    63    -9     0    86       0         0
DATA          6           1       -3    63   -11     0    86       0         0
DATA          7           1       -3    63   -12     0    86       0         0
DATA          8           1       -4    63   -15     0    86       0         0
```

The highlighted row for the ConfigIndex of 6 provides the parameters for enabling the egress link of the circuitry 66-2 (STSX). Similarly for the FPGA1, whose CONFIG_DATA gave a TTYP of 11, TREV of 1, and DREV of 2. The desired ConfigIndex is 2 and the configuration table is illustrated below for the FPGA1 side with the highlighted row for the ConfigIndex of 2 providing the parameters for enabling the link of the FPGA 112.

```
# FPGA1 Configuration Table
# START OF METADATA
TYPE         11
TREV          1
NROW         16
HEAD      ConfigIndex  TxDiffCtl   TXPostEmp   TXPreEmp   RXEqMix ...
MIN           0           0           0           0         0
MAX          20          15          31          15         7
# START OF DATA
DATA          0           7           0           0         3
DATA          1           7           6           1         3
DATA          2           8           9           1         1
DATA          3           8          12           2         1
DATA          4           8          14           2         7
```

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A system, comprising: a plurality of modules;
a backplane communicatively coupled to the plurality of modules;
a plurality of links over the backplane defined between the plurality of modules wherein each of the plurality of links comprises a first segment of electrical connection on one of the plurality of modules, a plurality of one or more electrical connections over traces on the backplane, and a second segment of electrical connection on another of the plurality of modules, and wherein lengths of the plurality of links are dependent upon locations of the plurality of modules on the backplane; and
a link management system to dynamically managing equalization parameters comprising transmit equalization, transmit power levels, and receiver settings associated with the plurality of links based on an associated length, the link management system to selectively disabling any inactive links of the plurality of links to any of a removed module of the plurality of modules or an unequipped module of the plurality of modules.

2. The system of claim 1, further comprising:
a plurality of codebooks each of which is associated with one of the plurality of modules and the backplane, wherein the plurality of codebooks comprise a set of files describing physical link topologies and configuration parameters associated therewith.

3. The system of claim 2, further comprising:
local storage on each of the plurality of modules, wherein codebooks associated with each of the plurality of modules are stored in the local storage.

4. The system of claim 2, further comprising:
a release file system associated with the system, wherein codebooks associated with the backplane are included in the release file system.

5. The system of claim 2, wherein the link management system
comprises: a link manager component implemented on at least one of the plurality of modules and managing data retrieval from the plurality of codebooks and determine the equalization parameters therefrom; and
a link servicer component implemented on remaining modules of the plurality of modules and accessing local storage for an associated codebook of the plurality of codebooks and handle requests from the link manager component.

6. The system of claim 5, wherein the link manager component is
to: for a link of the plurality of links, obtain data from the plurality of codebooks on a per segment basis; compute an overall loss for the link based on the data per segment; and
obtain the parameters based on the computed overall loss.

7. The system of claim 5, wherein the link manager component is to: continually monitor the plurality of links; and recalculate the parameters on any of the plurality of links based on any monitored changes.

8. The system of claim 5, wherein the link manager component is
to: selectively disable any inactive links of the plurality of links.

9. The system of claim 6, wherein the link manager component is to: push the equalization parameters to the link servicer component for implementation thereof.

10. The system of claim 9, wherein the link servicer component is to:
set transmission power for the link based on the pushed equalization parameters.

11. The system of claim 1, wherein each of the plurality of links comprises an electrical link defined by at least one segment, connectors disposed at segment boundaries, and transceivers at each end.

12. A link management method, comprising:
for a system, defining a codebook for each module, device, and interconnect in the system, the codebook comprising data describing physical link topologies and configuration parameters associated therewith;
for initializing a link in the system, obtaining codebooks for each segment in the link;
calculating an overall link loss for the link based on data in the codebooks; and
obtaining configuration parameters for the link based on the overall link loss,
wherein the link comprises a first segment of electrical connection on a module, an electrical connection over traces on a backplane, and a second segment of electrical connection on another module, and wherein a length of the link is dependent upon locations of the modules on the backplane, and
wherein any inactive links of the plurality of links are selectively disabled due to any of a removed module of the plurality of modules or an unequipped module of the plurality of modules.

13. The link management method of claim 12, further comprising:
for provisioned links in the system, monitoring link attributes; and
selectively disabling inactive links based on the monitoring.

14. The link management method of claim 12, further comprising:
for provisioned links in the system, monitoring link attributes for external and internal stimuli; and
dynamically updating the configuration parameters of any of the provisioned links in the system based on any monitored external and internal stimuli.

15. The link management method of claim 12, further comprising:
providing a new module for the system, wherein the new module comprises local storage with an associated codebook; and
utilizing the new module in the calculating with the data from the associated codebook on the new module.

16. A method of operating a high speed system, comprising:
operating a system comprising a plurality of circuits on different modules interconnected by a plurality of segments;
for a new link between two circuits of the plurality of circuits, the new link comprising at least one segment of the plurality of segments, obtaining data for each of the at least one segment, performing a calculation based on the obtained data, and determining configuration parameters for the new link based on the calculation;
for inactive segments of the plurality of segments, selectively disabling the inactive segments thereby reducing power consumption of the system; and for any active segments of the plurality of segments, monitoring attributes associated therewith and dynamically updating configuration of any of the active segments based on any monitored external and internal stimuli, wherein the new link comprises an electrical connection between the two circuits of the plurality of circuits over traces on a backplane and wherein a length of the new link is dependent upon locations of the two circuits of the plurality of circuits on the backplane, and wherein any inactive segments of the plurality of segments are selectively disabled due to any of a removed circuit of the plurality of circuits or an unequipped circuit of the plurality of circuits.

17. The method of claim 16, further comprising:
for a new module introduced subsequent to the system operating, obtaining data for segments using the new module from local storage on the new module.

18. The method of claim 16, wherein the obtaining data comprises:
obtaining data associated with segments on modules from local storage associated therewith; and
obtaining data associated with segments on backplane links from a database associated with a software release for the system.

* * * * *